(12) United States Patent
Deny et al.

(10) Patent No.: US 7,123,258 B2
(45) Date of Patent: Oct. 17, 2006

(54) METHOD, DEVICE AND PROGRAM FOR THREE-DIMENSIONAL MODELING OF A GEOLOGICAL VOLUME BY 3D PARAMETERING OF THE GEOLOGICAL DOMAIN

(75) Inventors: Laurent Deny, Neuves-Maisons (FR); Richard Cognot, Laxou (FR)

(73) Assignee: Earth Decision Sciences, Vandoeuvre-les-Nancy (FR)

(*) Notice: Subject to any disclaimer, the term of this patent is extended or adjusted under 35 U.S.C. 154(b) by 250 days.

(21) Appl. No.: 10/468,082

(22) PCT Filed: Dec. 10, 2002

(86) PCT No.: PCT/FR02/04247

§ 371 (c)(1),
(2), (4) Date: Jul. 22, 2004

(87) PCT Pub. No.: WO03/050766

PCT Pub. Date: Jun. 19, 2003

(65) Prior Publication Data

US 2004/0246249 A1 Dec. 9, 2004

(30) Foreign Application Priority Data

Dec. 10, 2001 (FR) .................................. 01 15945

(51) Int. Cl.
*G06T 17/50* (2006.01)

(52) U.S. Cl. ..................................................... 345/423

(58) Field of Classification Search ..................... None
See application file for complete search history.

(56) References Cited

U.S. PATENT DOCUMENTS

| 4,821,164 | A | | 4/1989 | Swanson |
| 5,555,352 | A | * | 9/1996 | Lucas .......................... 345/423 |
| 5,844,564 | A | | 12/1998 | Bennis et al. |
| 5,949,425 | A | * | 9/1999 | Willis .......................... 345/428 |
| 6,910,001 | B1 | * | 6/2005 | Hammersley et al. ......... 703/2 |

FOREIGN PATENT DOCUMENTS

| EP | 0 254 325 B2 | 3/1999 |
| WO | 00/42576 | 7/2000 |

OTHER PUBLICATIONS

Christopher B. Jones, "Data Structures for Three-Dimensional Spatial Information Systems in Geology," Int. J. Geographical Information Systems, V. 3, 1989, pp. 15-31.
S. Wang et al., "Shape Simplification of Free-Form Surface Objects for Multi-Scale Representation," Systems, Man and Cybernetics, 1996, IEEE International Conference on, 1996, IEEE, pp. 1623-1628.

* cited by examiner

*Primary Examiner*—Mark Zimmerman
*Assistant Examiner*—Andrew Yang
(74) *Attorney, Agent, or Firm*—Young & Thompson

(57) ABSTRACT

A method for three-dimensional modelling of a geological volume, which consists in defining cells adapted to the critical surfaces of the geological volume to be modelled; defining an assembly of polyhedral macrocells (M) adapted to the geometry (1) of the geological layers of the volume to be modelled; parametering the geological space to match the observed geological domain and a parametric domain by associating with a point belonging to the geological domain an image point located in the parametric domain; then defining a virtual subdivision of the polyhedral macrocells (M) into hexahedral microcells (m) whereof the geometry is obtained by subdividing the geometry of each macrocell (M).

14 Claims, 3 Drawing Sheets

METHOD, DEVICE AND PROGRAM FOR THREE-DIMENSIONAL MODELING OF A GEOLOGICAL VOLUME BY 3D PARAMETERING OF THE GEOLOGICAL DOMAIN

The invention relates to a process for three-dimensional modeling of a property f(x,y,z) defined in a geological volume, in which there are defined cells adapted to the critical surfaces of the geological volume to be modeled.

The invention also relates to a device for three-dimensional modeling of a geological volume for practicing a process according to the invention.

The invention finally relates to a computer program permitting the operation of a programmable device for three-dimensional modeling of a geological volume, for practicing a process according to the invention.

In a known manner, the modeling of a geological volume is divided into two principal steps corresponding successively to the construction of a structural model, then the construction of a model of properties.

As shown in FIG. 1, the construction of a structural model consists in the decomposition of the geological space in an assembly of so-called "homogeneous" regions generally bordered by three types of surfaces: the "fault surfaces" which result from faults or breaks taking place generally after deposition of the materials which constitute the geological layers; the "horizon surfaces" which constitute the separation between successive layer and which take their name from the fact that they were approximately horizontal at the time of deposit of the materials constituting the layers; and the limit surfaces introduced artificially to limit laterally the extent of the domain under study.

The construction of a structural model makes use of techniques known from and described in for example the document "Mallet, J. L., 1997: Discrete Modeling for Natural Objects, Journal of Mathematical Geology, V. 29, No. 2, pp. 199–219", and does not require a more detailed description.

To carry out the three-dimensional modeling of a geological volume, it is necessary to proceed to the construction of a model of properties. The subsoil is thus characterizable by an assembly of properties comprising particularly: permeability, porosity, density, seismic speed or the probability of belonging to a given geological facies. A given property is generally known from a plurality of points of observation of a studied geological domain and can be defined in each homogeneous region of the studied geological domain, by using interpolation methods known such as for example the method of "krigeage" described in the publication "Deutsch, C. V., and Journel, A. G., GSLIB: Geostatistical Software Library and User's Guide (second edition) (1998)) 369 pages", edited by Oxford University Press, New York.

These methods of interpolation are satisfactory when the interpolation is carried out and recorded in a computer memory at each node of a regular grid with hexahedral meshes, and when the nodes of the regular grid with hexahedral meshes are disposed parallel to the horizons.

To approach these two conditions and obtain satisfactory interpolations, as shown in FIG. 2, a regular grid is deformed so as to cause it to match the shape of the horizons. The major defect of such an approach is that the regular grid becomes curvilinear; this requires storing all the coordinates of each node of such a curvilinear grid in the memory of a computer and gives rise to an important and undesirable consumption of memory capacity in the computer.

A smaller consumption of memory capacity in the computer can be obtained in the case of a process producing hexahedral cells restricted to projecting vertically in the form of a regular rectilinear grid in the horizontal plane. EP 0 254 325 B2 thus describes a process for three-dimensional mathematical modeling of a delimited geological volume, by construction of layers consisting in multiple cells. The geometrical volume is delimited by critical surfaces, and has a given stratigraphicstructure which comprises inclined sedimentary layers. The process comprises the steps of construction of a separate grid to fill the space comprised between each critical surface delimiting said volume so as to define a model space representative of said volume, constructing layers of cells within said model space, and allocating attributes from the emplacements located in said real volume in cells which correspond, as to their position within said model volume, to the positions of the attributes in the real volume.

The constructive cells are located in layers of cells having edges with vertical angles, whose length varies so as to conform to the geometry of the corresponding sedimentary layers located in the geological volume. The cells in each layer have a constant predetermined vertical thickness between the critical surfaces in no matter what position, in the case in which the cell does not terminate at the level of a critical limiting surface. The real volume is a geological volume having a stratigraphicgeological structure constituted by stacked inclined layers of sedimentary deposits. The constructed grills form a model volume analogous to the real volume. The layers of cells are disposed, in the model volume, according to vertical columns of cells and the layers of cells are inclined and stacked in the same manner as the layers of sediment in the real volume.

The critical surfaces are critical surfaces of initialization or critical surfaces of limitation comprising inclined sedimentary layers intercalated between the critical surfaces in the stratigraphicstructure. The constructed grids are grids for initialization or limitation serving to represent the limitation surface according to the given stratigraphicstructure. The cells are disposed in vertical columns from one layer to the next, and the layers of cells are constructed essentially parallel to the critical surface of initialization and have a constant height along their respective layer.

The object of the present invention is to provide a process for three-dimensional modeling of a geological volume, by applying a general method of modeling of a function representing the variations of a given geological property within the studied geological domain, whilst saving memory space in the computer that is used.

Another object of the invention is to improve the known techniques of modeling, for example according to EP 0 254 325 B2, so as to avoid vertical alignment of the cells and reduce the quantity of memory of the grill thus constructed.

Another object of the invention is to facilitate the consultation of the results of modeling by using structured programming techniques.

The invention has for its object a process for three-dimensional modeling of a geological volume, in which there are defined cells adapted to the critical surfaces of the geological volume to be modeled, characterized by the fact that the process comprises the following steps:

a) defining an assembly of geological macrocells adapted to the geometry of the geological layers of the volume to be modeled;

b) carrying out a parametering of the geological space to match the studied geological domain and a parametric domain by associating with a point belonging to the geological domain, an image located in the parametric domain;

c) defining a virtual subdivision of said macrocells into microcells, whose geometry is obtained by subdivision of the geometry of each macrocell, such that the positions of each microcell will be deduced by interpolation of the positions of the summits of the corresponding macrocell and such that microcells corresponding to the nodes of a regular grid cover the parametric domain; so as to model a function representative of a geological property on the regular grid of the parametric domain by reducing the number of data to be memorized.

According to other alternative characteristics of the invention:

the parametric domain is covered by a regular rectilinear grid whose coordinates of the nodes can be detected by computation from the coordinates (uO, vO, wO) of a node of origin and the interval of the grid in its principal directions (u,v,w).

the parametering of the geological space to match the studied geological domain and a parametric domain is such that a parametric coordinate (w) of the regular grid of the parametric domain remains constant on the image of each horizon and such that the gradient of the images (u,v,w) remains other than zero.

the parametric coordinates (u,v,w) of any image point of a point (x,y,z) located within a macrocell of the geological domain, are calculated by interpolation of the parametric coordinates of the summits of the macrocell supposed precalculated and stored in a computer memory.

the data of the function f representative of a geological property observed at sampling points (xi,yi,zi) of the geological domain are transposed into points (ui,vi,wi) of the parametric domain.

the value f(x,y,z) of the modeled function is "transported" between a geological point (x,y,z) and an image point (u,v,w) of the parametric domain.

the value f(x,y,z) of the modeled function can be interpolated to the nodes of the regular grid covering the parametric domain; or the value f(x,y,z) at a geological point X(x,y,z) of the modeled function can be obtained by reading the value of f associated with the node (i,j,k) nearest to the image (u,v,w) of the geological point X(x,y,z) in the regular grid.

The invention also has for its object a device for three-dimensional modeling of a geological volume, in which there are defined cells adapted to the critical surfaces of the geological volume to be modeled, characterized by the fact that the device comprises means to define macrocells adapted to the geometry of the geological layers of the volume to be modeled, means to carry out parametering of the geological space to match the studied geological domain and a parametric domain by associating with a point associated with the geological domain an image point located in the parametric domain; and means to define a virtual subdivision of said macrocells into microcells, whose geometry is obtained by subdivision of the geometry of each macrocell, such that the positions of the summits of each microcell will be deduced by interpolation of the positions of the summits of the corresponding macrocell and such that the microcells correspond to nodes of a regular grid covering the parametric domain.

Finally, the invention has for its object a computer program, comprising elements of program code to carry out the steps of the process according to the invention, when said program is executed by a computer.

The invention will be better understood from the description which follows, given by way of non-limiting example and with reference to the accompanying drawings, in which:

With reference to FIGS. 3 to 6, identical or functionally equivalent elements are indicated by the same reference numerals.

Figure 1:
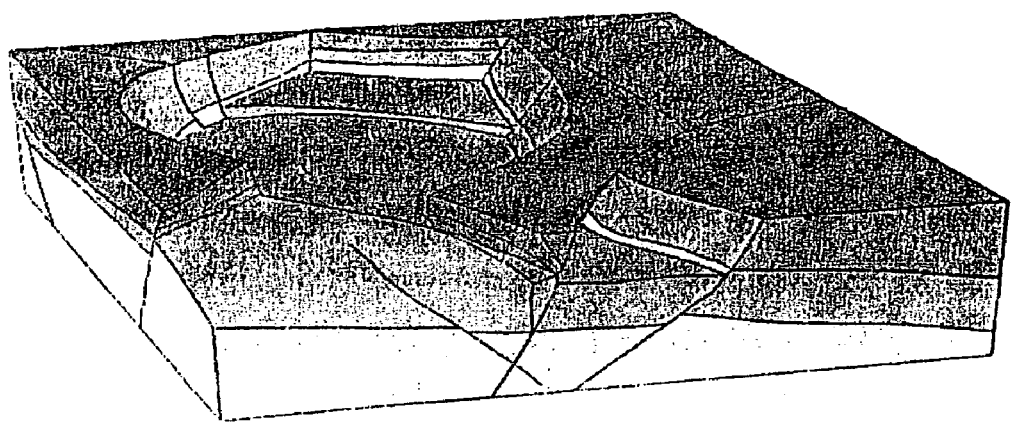
FIG. 1 shows schematically, in perspective view, a structural model of known type comprised by homogeneous regions bordered by fault surfaces, horizon surfaces and artificial surfaces limiting the lateral extent of a first geological domain.
Figure 2:
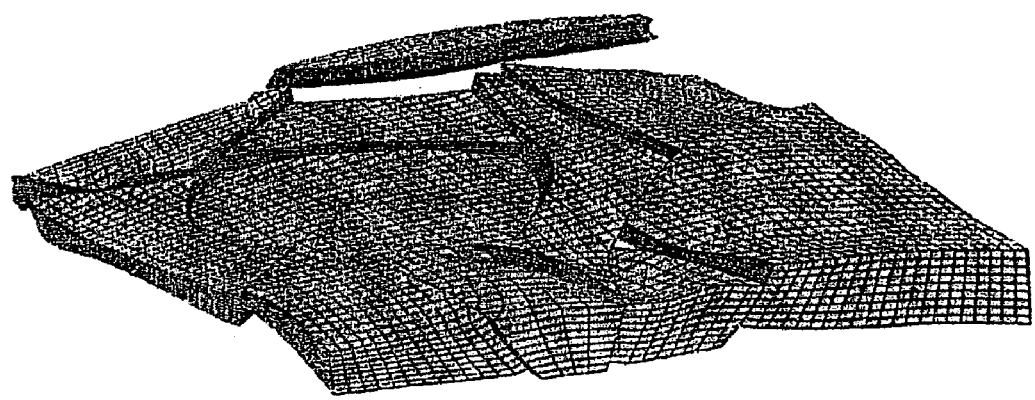
FIG. 2 shows schematically, in exploded perspective, an example of a regular curvilinear grid of the prior art covering the geological domain of FIG. 1.
Figure 3:
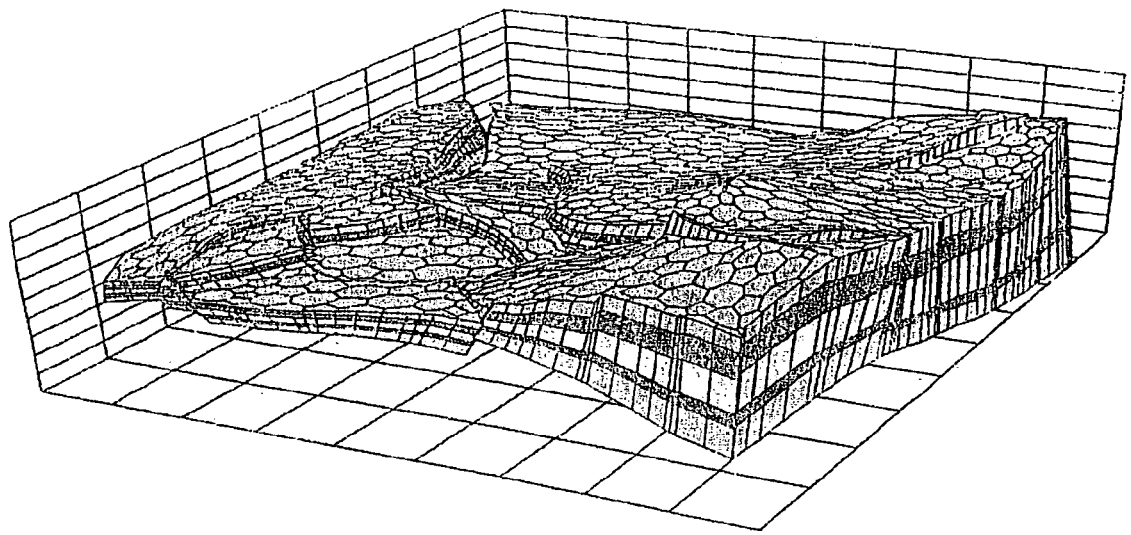
FIG. 3 shows schematically a perspective view of an example of cutting off another geological domain G into polyhedral cells according to the invention, whose ridges do not cut the horizons and the faults.

In FIG. 3, another geological domain G is cut up into polyhedral cells according to the invention whose edges do not cut the horizons and the faults.

The cells thus obtained by no matter what known process, are called in the present description "geological macrocells M" which carry out a partition of the geological domain G into adjacent "geological macrocells M" which are small elements of polyhedral volumes.

This partition of the geological domain G into adjacent "geological macrocells M" is for example adapted to permit the study of the migration of fluids, the unfolding of geological layers or else tracing seismic radiations. These polyhedral macrocells M subdivide the structural model of FIG. 3, such that the edges of the polyhedral cells never cut the horizons and the faults and such that the spaces of the polyhedral cells are either substantially parallel to the horizons, or substantially orthogonal to the horizons.

The number of cells necessary to observe these requirements does not depend on the complexity of the horizons and the faults. In practice, such a cutting up of the geological domain generally requires only a reduced number of macrocells M independently of the complexity of the function f(x,y,z) to be modeled; this permits storing in a computer memory only the coordinates (x,y,z) of each summit of the macrocells in the geological domain G.

If there is considered a particular macrocell M designated by C and if there are designated by $\{X1(C), X2(C), \ldots, Xn(C)\}$ the summits of this cell C in the geological domain G, it is possible to find for any point X located within this cell C, the coefficients $\{a1(X,C), a2(X,C), \ldots, an(X,C)\}$ such as:

$$X = a1(X,C) \cdot X1(C) + a2(X,C) \cdot X2(C) + \ldots + an(X,C) \cdot Xn(C)$$

There can be chosen particularly for $\{a1(X,C), a2(X,C), \ldots, an(X,C)\}$ an assembly of barycentric coordinates of X relative to $\{X1(C), X2(C), \ldots, Xn(C)\}$.

If there are designated by (x,y,z) the geological coordinates of X and by (xi(C), yi(C), zi(C)) the coordinates of the summit Xi(C), the above equation is thus equivalent to the three following equations:

$$x = a1(X,C).x1(C) + a2(X,C).x2(C) + \ldots + an(X,C).xn(C)$$

$$y = a1(X,C).y1(C) + a2(X,C).y2(C) + \ldots + an(X,C).yn(C)$$

$$z = a1(X,C).z1(C) + a2(X,C).z2(C) + \ldots + an(X,C).zn(C)$$

The generalization of these equations permits a subdivision of the "geological macrocells M", which are "virtually" cut into geological microcells m.

The process according to the invention permits "virtually" cutting up the macrocells into microcells by avoiding storing explicitly the coordinates (x,y,z) of the summits of the microcells, and obtaining a considerable saving of memory relative to the prior art.

The cutting up of the macrocells into microcells remains "virtual", because it is useless to compute explicitly and store the coordinates (x,y,z) of the summits of the microcells.

The process according to the invention thus uses the construction of a vectorial mathematical function X(u,v,w)=[x(u,v,w),y(u,v,w),z(u,v,w)] and its inverse U(x,y,z)=[u(x,y,z),v(x,y,z),w(x,y,z)] associating in correspondence a point (u,v,w) of a parametric image space to the coordinates (x,y,z) of each point in the geological space.

The function U(x,y,z) is defined as follows:

In an initialization phase, there are arbitrarily chosen parametric coordinates (u,v,w) for each image point associated with each summit of all the macrocells M, such that:

w is constant at each summit of all the macrocells M located on a same geological horizon;

the reciprocal geological surfaces of the iso-value planes of u and the iso-value planes of v are substantially orthogonal to the geological horizons;

the reciprocal geological surfaces of the iso-value planes of u and of the iso-value planes of v are substantially orthogonal to each other.

Then there are stored in a computer memory the parametric image coordinates (u,v,w) associated with each summit of all the macrocells M.

For each coordinate point (x,y,z) located in a macrocell C of the geological space, there is defined the value of U(x,y,z) as obtained by interpolation of the image parametric coordinates (u,v,w) associated with the summits C and previously stored in the computer memory. There can for example be carried out tri-linear interpolations with the help of the mentioned barycentric equations or other tri-linear interpolations not using the first degree coordinates (x,y,z).

The image parametric space is preferably covered by a three-dimensional rectilinear grid G whose nodes G[i,j,k] are indicated by whole indices (i,j,k). The parametric coordinates u(i,j,k), v(i,j,k) and w(i,j,k) of each node G[i,j,k] are linear functions of the indices (i,j,k).

The geological point X(x,y,z) of the geological space, corresponding or antecedent to each node G[i,j,k] is considered as the center of a "virtual" geological microcell located at point X with coordinates x(u(i,j,k), v(i,j,k), w(i,j,k)); y(u(i,j,k), v(i,j,k), w(i,j,k)); z(u(i,j,k), v(i,j,k), w(i,j,k)).

The possible large number of these "virtual" geological microcells does not depend on the size of the geological microcells and depends only on the spacing of the nodes of the grid G.

To each corresponding or antecedent geological point X(x,y,z) of each node G[i,j,k] taken as the center of a "virtual" microcell of the geological space, can be attached a physical property associated with the center of this microcell.

There is constructed a three-dimensional matrix T[i,j,k] containing the values of this property indexed such that the property at the center X of a "virtual" geological microcell corresponding or antecedent to a node G[i,j,k] will be stored in T[i,j,k].

Thus only the values of the physical property at the center X(x,y,z) of each microcell are stored in the memory in the form of a three-dimensional matrix T[i,j,k]; whilst the coordinates of the center X(x,y,z) or the summits of these microcells are never stored and can be located by means of the locating function X(u,v,w)=[x(u,v,w),y(u,v,w),z(u,v,w)] applied to the grid G.

The advantage of the modeling process according to the invention is thus to avoid having to store coordinates (x,y,z) of the summits or the centers of the microcells. There results a considerable gain in space relative to the known processes, which require the storage of at least certain coordinates of the microcells.

Contrary to the known processes in which a single value of the modeled property is stored per cell, it is no longer necessary to adapt the size of these cells to the more or less great local variation of said property. The invention thus permits "uncoupling" the representation of the modeled property from that of the geometry of the cells and permits the distribution of the geological space among a limited number of macrocells of a generally large size selected as a function of the complexity of the geometry of the horizons and the faults and independent of the complexity of the property to be modelized.

Figure 4:
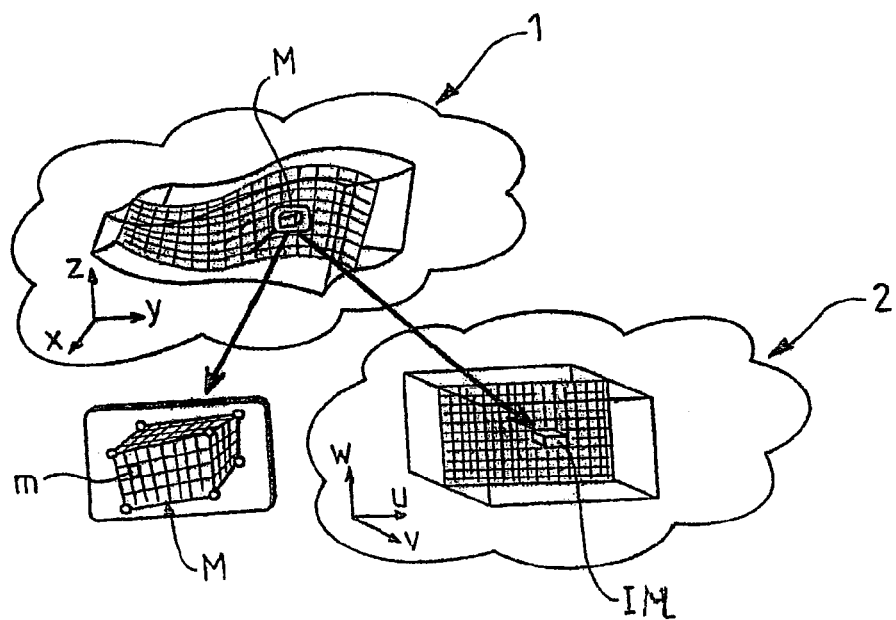
FIG. 4 shows schematically the matching for modelizing a geological volume with the help of the process according to the invention.
Figure 5:
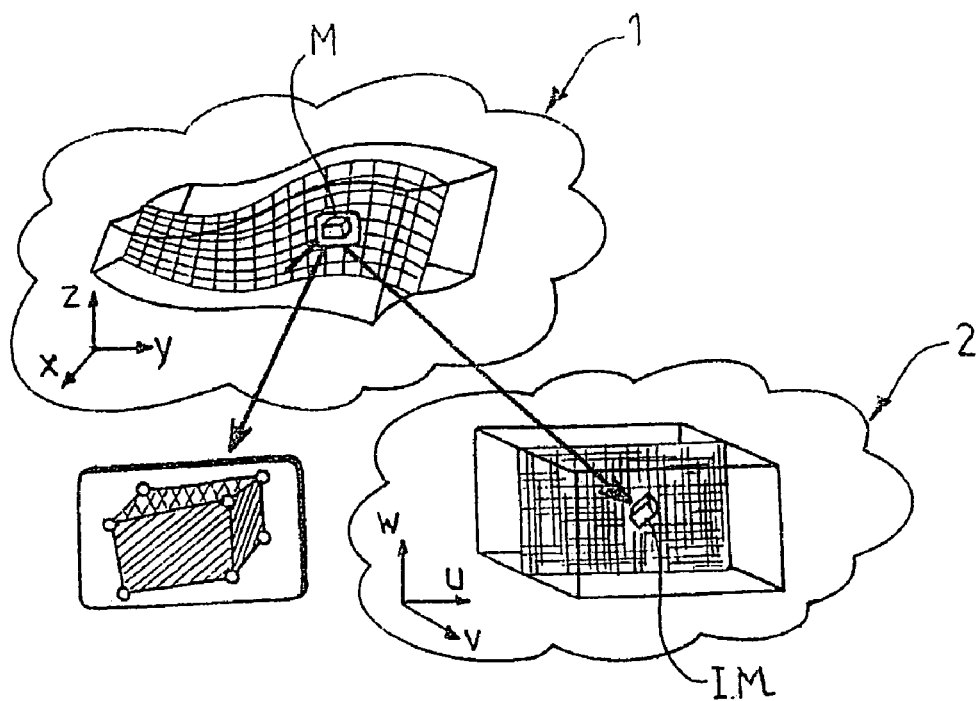
FIG. 5 shows schematically another matching for modeling a geological volume with the help of the present invention.
Figure 6:
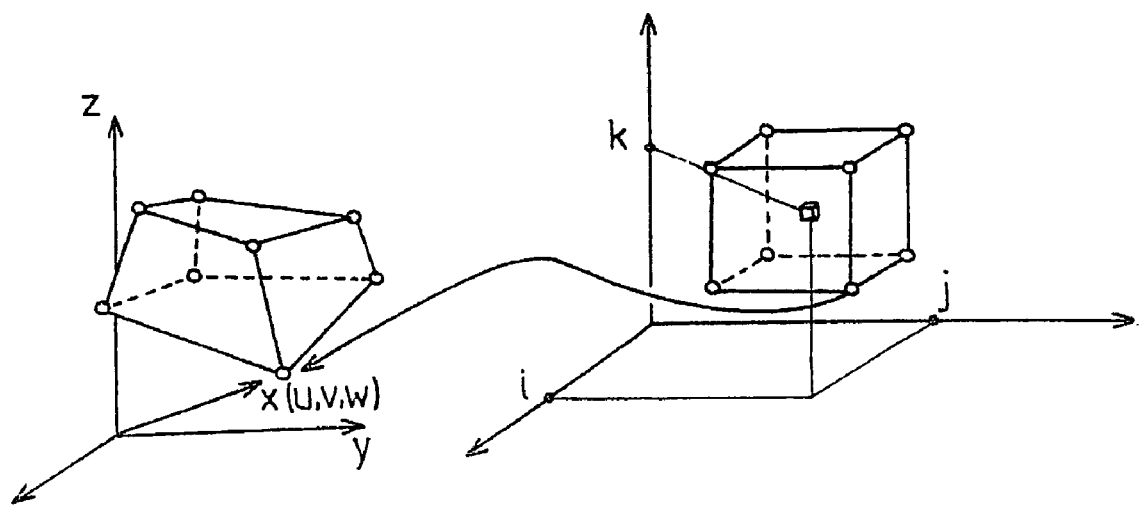
FIG. 6 shows schematically a matching of the microcells for the modeling of a geological volume with the help of a process according to the invention.

In FIGS. 4, 5 and 6, a geological volume indicated generally by 1 is matched with an image space indicated generally by 2 with the help of a mathematical modeling process according to the invention.

In the prior art, one of the usual processes to construct a geological model consists in decomposing the geological layers into an assembly of adjacent polyhedral three-dimensional cells. Generally, the cells have a hexahedral shape and are disposed such that two adjacent hexahedral cells will share a common surface. The hexahedral cells are disposed regularly so as to have upper and lower surfaces parallel to the geological layers. The regular arrangement of the cells can be interrupted by discontinuities or critical surfaces corresponding to geological faults or geological accidents. In the case of geological faults or accidents, the surfaces of the cells can be disposed tangentially to the critical surface; or alternatively, the cells can be distributed about a broken contour surrounding and approximating the critical surface corresponding to the fault. The geometry of a network thus constructed is defined entirely by the coordinates of the summits of the cells in the geological space. Preferably, in this known technique, the edges of the hexahedral cells are disposed so as to orient the edges connecting the upper and lower surfaces of the cells in a direction approximately perpendicular to the geological layer to be modeled. In the known technique, there can be constructed regular networks, which is to say networks of cells of adjacent shapes and regularly aligned; there can also be constructed irregular three-dimensional curvilinear networks, in which the cells have a polyhedral shape, the cells not necessarily having the same shape, the cells are not necessarily regularly aligned, whilst being adjacent. The cells are preferably selected to be a size sufficiently small to contain a homogeneous geological facies having substantially constant physical properties, for example a constant porosity and/or permeability. To obtain a good representation of the variation of physical properties in the geological layers, it is thus necessary to construct a very large number of cells, which requires a very large quantity of storage memory.

To overcome this drawback, U.S. Pat. No. 4,821,164 and EP 0 254 325 B2 propose to construct the cellular network such that their projections in a horizontal plane constitute a regular orthogonal network. This implies that the hexahedral cells have their vertical edges aligned. This simplified model thus permits easily retrieving the coordinates by horizontal projection of the cells thus constructed, the only component that has to be memorized being the vertical component of each summit. Thus, this vertical component is adapted to vary as a function of the thickness of the modeled geological layer.

The present invention is distinguished from the prior art by providing a modeling technique at two levels corresponding to stages of successive modeling.

In a first stage, the geometric subsurface is modeled by defining an assembly of hexahedral or polyhedral macrocells adapted to the geometry of the geometric layers of the volume 1 to be modeled. In a second step, there is defined a subdivision of the macrocells M into hexahedral or polyhedral microcells m, whose geometry is obtained by subdivision of the geometry of each macrocell.

The geological space 1 is thus divided into macrocells M disposed along a curvilinear network, according to a technique known per se. This definition of an assembly of adjacent macrocells M permits defining in the case of FIG. 4 a triplet of coordinates x, y, z defining a summit of each macrocell M, and thus defining the coordinates of the summits of the regular curvilinear network of FIG. 5. Each image IM of macrocell M shown by its associated triplet x, y, z, is stored in an imaged space 2 corresponding to a recordation $U(x,y,z)=[u(x,y,z),v(x,y,z),w(x,y,z)]$ according to a three-dimensional matrix of the data corresponding to the macrocell.

Each summit of the image IM of a macrocell M is indexed in the three-dimensional matrix of the image space 2 by a triplet of whole numbers i, j, k.

The second step of the process according to the invention consists in "virtually" dividing the polyhedral (or hexahedral) macrocells M into hexahedral microcells m. Each macrocell is thus "virtually" regularly divided into a whole number of microcells m, whose number is selected as a function of the complexity of the variations of the physical properties (for example: permeability, porosity) to be modeled.

In practice, the microcells m are sufficiently small that the physical properties remain substantially constant within each microcell m. An iteration by successive divisions permits verifying this condition, or "virtually" increasing the number of microcells m within a given macrocell M if this condition is not respected.

Thus, thanks to the invention, the subsurface is modeled as a three-dimensional regular curvilinear network constituted by adjacent polyhedral or hexahedral macrocells M in the geological space 1. The size of the polyhedral or hexahedral macrocells M is adapted to the complexity of the geometry of the principal geological structures (principal horizons and faults) and does not take account of the variation of the physical properties within the macrocells M. The physical properties within the macrocells M are thus not necessarily constant and need not be memorized in the macrocells M. The only function of the macrocells M is thus to divided the geometrical space of the geological volume to be modeled.

The macrocells M can have a substantially polyhedral or hexahedral shape, but their edges are not necessarily parallel to a predetermined direction, and in particular the edges in the vertical direction are not necessarily parallel to the vertical axes of the coordinates, contrary to the teaching of U.S. Pat. No. 4,821,164 or EP 0 254 325 B2.

Given that the only function of the macrocells M is to partition the geological layers, the uncoupling between the geometry of the macrocells M and the variations of the physical properties of the medium to be studied, permit covering an extended geological space with a limited number of macrocells M adapted to the geometry of the geological layers of the volume to be modeled, respecting the critical surfaces such as the geological faults and the upper and lower limits of the geological layers in question.

As is shown in the enlarged detail view of FIG. 4, FIG. 5 or FIG. 6, this macrocell M is "virtually" regularly divided into a number of microcells m selected as a function of the complexity of the variations of the physical properties (permeability, porosity) to be modeled.

The indexing of the microcells m can be carried out in a manner analogous to the indexing of the macrocells M in the image space 2, by indexation with the help of a triplet i, j, k, so as to establish a bijective correspondence between each microcell and a triplet i, j, k of the three-dimensional matrix of the image space 2 and so as to respect the properties of the two adjacent microcells m, namely to index the adjacent microcells m by adjacent triplets i, j, k and corresponding to their respective geological position.

The cutting up of the macrocells M into microcells m thus permits recording the physical properties within each microcell by associating them with a triplet i, j, k of the three-dimensional matrix of the image space 2.

This association constitutes a particularly advantageous characteristic of the modeling process according to the invention, by permitting reducing the total memory space necessary for practicing the invention.

Other particularly advantageous characteristics of the process of modeling of the invention result from the "virtual" modeling of the geometry of each microcell.

Thus, the modeling of the geometry of each microcell m can be carried out without recording the geometric positions of the characteristic summits of the microcells m. It suffices to deduce the position of the characteristic summit or the center of each microcell by referring to the position of the characteristic summits of the corresponding "mother" macrocell.

This characteristic also permits a considerable saving of memory space, because the technique of geological modeling according to the invention is more compact than a modeling requiring the recordation of all the characteristic summits of the microcells m by a factor at least equal to triple the number of microcells m in the macrocell in question.

By way of example, in the most simple particular case, there can be computed the curvilinear image coordinates u, v, w of the characteristic summit of a microcell associated with the triplet i, j, k of a three-dimensional matrix by the following operations:

$$u \equiv i + \tfrac{1}{2};$$

$$v \equiv j + \tfrac{1}{2};$$

$$w \equiv k + \tfrac{1}{2}.$$

In these formulae, the dimensional matrix is represented as an assembly of points in a three-dimensional space with whole coordinates i, j, k; the curvilinear coordinates u, v, w of the associated regular network being considered as continuous interpolations of the emplacement of the position of the coordinates of the three-dimensional matrix.

It should be noted that the summits of the macrocells M are also the summits of certain microcells m and as a result that the summits of these certain microcells m give images u, v, w in the parametric space 2 of the summits of the macrocells M.

In FIG. 6, for each macrocell M, it is possible to construct a continuous vectorial function by sections X (u, v, w) associating each point of the parametric space with a point of the geological space by interpolating the coordinates of the summits of each macrocell.

To this end, there can be used an interpolation method described as "hyperpatches" described in the work of MORTENSON published in 1985 under the title "Geometric Modeling" in the Editions John Wiley, New York; or for example a method of approximation or interpolation of Bézier, or a method of interpolation and approximation of Spline.

It should be noted that the function X (u, v, w) as defined with the help of these methods depends only on the coordinates (x,y,z) of the summits of the macrocell in the three-dimensional space 1. As a result, X (u, v, w) is a vectorial function which can be used directly to compute the position of the summits of the microcells m in the geological space 1.

In FIG. 5, it will be noted that the process according to the invention of modeling at two levels described above can also be applied to regular three-dimensional curvilinear networks in the more general case in which the microcells m and the macrocells M are not aligned; the macrocells M contain a variable number of microcells m; and the macrocell network M is divided into subassemblies of macrocells M, each subassembly being associated with a separate three-dimensional matrix containing the microcells m of this subassembly.

The only condition required for practicing the invention is to be able to recomputed the position of the summits of the microcells m from the position of the summits of the polyhedral or hexahedral macrocells M.

To this end, as shown in FIG. 4, FIG. 5 and FIG. 6, it suffices to associate the local coordinates u, v, w in the parametric space 2 with each summit of macrocells M, so as to be able thereafter to deduce by the cited interpolation methods, the positions of the summits of the microcells m.

A generalization of the invention as shown in FIG. 4 can again be extended to a more complete generalization, using macrocells M of polyhedral shape. It is preferably in this case that the microcells m contained in the polyhedral macrocells M have a hexahedral shape, so as to be able again to use in this case the general solution given above for regular networks.

The more general process according to the invention applied to this modified embodiment not shown, can use steps such as:

recording the parametric coordinates u, v, w of each of the summits of the macrocells M in the image space i, j, k of the three-dimensional matrices used to record the properties of the hexahedral microcells m;

constructing a vectorial function X (u, v, w) associating the parametric space with the geological space such that the function X (u, v, w) gives an interpolation of the predetermined summits of the network of macrocells M;

using the vectorial function X (u, v, w) as defined to compute the position of the summit or the center of each microcell m in the geological space x, y, z.

In this case, it is also possible to regroup the polyhedral macrocells M of an irregular subdivision of macrocells M in a subassembly corresponding to units or geological assemblies, by associating the subassemblies with separate three-dimensional matrices of the image space.

The invention described with reference to several particular embodiments is in no way thereby limited, but on the contrary covers all modifications of shape and variations of procedure according to the invention comprising the definition of an assembly of macrocells M, then a subdivision of said macrocells M into microcells m.

To practice the invention, there is preferably used a programmable device for three-dimensional modeling, comprising means to define polyhedral or hexahedral macrocells M suitable for the geometry of the geological layers of the volume to be modeled, as well as means to subdivide said macrocells M into microcells m, whose geometry is obtained by subdivision of the geometry of each macrocell.

Preferably, the three-dimensional modeling device according to the invention is a programmable device comprising a memory for storage of digital values, and controlled by a computer program that uses a three-dimensional modeling process according to the invention.

To model the rapid variations of a property f(x,y,z) with the help of a very fine regular grid, a modeling is programmed in several steps: parametering the geological space; making discrete the geological domain; modeling a property f(x,y,z).

The parametering of the geological space uses a matching between the geological domains G that is studied and a parametric domain P, by associating with each point of the coordinates (x,y,z) belonging to the geological domain G, an image located at the point of the coordinates (u,v,w) in the parametric domain P:

$$u = u(x,y,z)$$

$$v = v(x,y,z)$$

$$w = w(x,y,z)$$

The functions u(x,y,z), v(x,y,z), w(x,y,z) are continuously constructed piecewise and as they have no discontinuities except through faults, respect the following constraints:

The image of each horizon in the parametric domain P is a horizontal plane: w(x,y,z) is selected to be constant for any point of coordinates (x,y,z) belonging to a same horizon.

The image of any pair of separate points (x1,y1,z1) and (x2,y2,z2) located in the geological domain G consists of a pair of separate points (u1,v1,w1) and (u2,v2,w2) in the parametric domain P: the gradient of the functions u(x,y,z), v(x,y,z) and w(x,y,z) is selected so as never to cancel itself in the geological domain G that is being studied.

The functions u(x,y,z) v(x,y,z) and w(x,y,z) are given at a certain number points of sampling (xi,yi,zi) located in the geological space and are digitally interpolated with the help of a known method compatible with the discontinuities through the faults, for example, a method of krigeage or the method DSI of the paper "Mallet, J. L., (1992), Discrete Smooth Interpolation in Geometric Modeling, Computer-Aided Design, V.24, No. 4, pp. 177–191".

Let there be designated by F(t) a strictly monotone function selected arbitrarily; for example, there can be selected F(t)=(tO−t) wherein tO is a given arbitrary constant. To find the sampling points (xi,yi,zi) belonging to the geologic region G for which the values u(xi,yi,zi), v(xi,yi,zi) and w(xi,yi,zi) are given, w(xi,yi,zi)=F(k) is fixed for any point (xi,yi,zi) belonging to the horizon Hk from a list {H1,H2, . . . ,Hn} of the horizons located in the domain G and classified by decreasing order of geological age; then, by using a method permitting constructing a parameterization u(x,y,z), v(x,y,z) for each horizon H (for example, the method described in "Lévy, B. and Mallet, J. L., (1998), Non-distorted texture mapping for sheared triangulated meshes, ACM-SIGGRAPH 1998 Conference Proceedings, Orlando, Fla., pp. 343–352") there are calculated the values u(xi,yi,zi) and v(xi,yi,zi) at any sampling point located on H.

The discretization of the geological domain is performed such that the edges of the polyhedral cells never cut the horizons and faults and such that the surfaces of the polyhedral cells will be substantially parallel or substantially orthogonal to the horizons.

For each summit of the reduced number of cells (macrocells), obtained after discretization of the geological domain, there are stored in a computer memory the coordinates (x,y,z) of the summit in the geological domain G and the coordinates (u,v,w) of the image of the summit in the parametric domain P.

The modeling of a property f(x,y,z) is facilitated by the fact that the parametric domain is covered by a regular three-dimensional grid with hexahedral meshes whose edges are rectilinear and orthogonal to each other, and by the fact that the coordinates (ui,vj,wk) of each node (i,j,k) of this grid are calculated simply by the following equations:

$$ui=uO+i.Du$$

$$vj=vO+j.Dv$$

$$wi=wO+k.Dw,$$

in which (uO,vO,wO) are the coordinates of the node of origin of the grid whilst Du, Dv and Dw are the intervals of the grid in the directions u, v and w.

The values (uO,vO,wO) and (Du,Dv,Dw) are stored in a computer memory to use the process of modeling of the function f(x,y,z).

This modeling process of the function f(x,y,z) comprises the following steps:
1. for each geological point X (xi,yi,zi) where there is observed the value f(xi,yi,zi) of the function to be modelized, one proceeds as follows to a "transport" of this value into the parametric domain at the point of coordinates (u(xi,yi,zi), v(xi,yi,zi), w(xi,yi,zi)):
    a. the geological macrocell C is determined that contains the point X(xi,yi,zi)
    b. the parametric coordinates (ui,vi,wi) of the image point of the geological point of X(xi,yi,zi) are found in the parametric domain
    c. the data fi=f(xi,yi,zi) is installed at the point (ui,vi,wi)
2. In the parametric space, by using for example a mentioned method of kriging or the mentioned DSI method, the property f(i,j,k) is interpolated in any node (i,j,k) of the regular grid and this value is stored in a computer memory.
3. for each point(x,y,z) in the geological domain G where it is desired to know the value f(x,y,z) of the function f, this value f(x,y,z) is recovered as follows:
    a. the macrocell C containing the point (x,y,z) is detected
    b. the point (u,v,w) image of (x,y,z) in the parametric domain P is located
    c. the indices (i,j,k) of the node of the regular grid nearest the point (u,v,w) are sought in the parametric space
    d. the value f stored in the computer memory associated with the node (i,j,k) is read and this read value is attributed to f(x,y,z); or alternatively, f(x,y,z) is computed as a local interpolation of the values of f associated with the nodes surrounding the point (u,v,w).

Thus, thanks to the invention, the storage of the coordinates of the nodes of the regular grid becomes useless: only the values (uO,vO,wO) and (Du,Dv,Dw) and the values of the function f studied, are to be stored in the computer memory.

The invention described with reference to several particular objects is in no way thereby limited, but on the contrary covers any variation of embodiment within the scope and spirit of the invention, the essential point being to carry out a modeling at two levels: a first level of geometric modeling not having to take account of the constancy of the physical parameters in the macrocell; and a second level of modeling that is more fine and adapted to a stability (approximately constant value) of the physical properties within each microcell.

The invention claimed is:

1. Process for three-dimensional modeling of a geological volume, in which cells are defined that are adapted to the critical surfaces of the geological volume to be modeled, characterized by the fact that the process comprises the following steps:
   a) defining an assembly of polyhedral macrocells in the geological domain adapted to the geometry of the geological layers of the volume to be modeled;
   b) carrying out a parametering of the geological space to match the geological domain studied and a parametric domain, by associating with a point belonging to the geometric domain an image point located in the parametric domain;
   c) defining a virtual subdivision of said macrocells into microcells, whose geometry is obtained by subdivision of the geometry of each macrocell, such that the positions of each microcell will be deduced by interpolation of the positions of the summits of the corresponding macrocell and such that microcells correspond to nodes of a regular grid covering the parametric domain; so as to model a function representative of a geological property on the regular grid of the parametric domain by reducing the number of data to be memorized.

2. Process according to claim 1, characterized by the fact that the parametric domain is covered by a regular rectilinear grid whose coordinates (u,v,w) of the nodes can be retrieved by computation from the coordinates (uO,vO,wO) of a node of origin and the intervals of the grid in its principal directions.

3. Process according to claim 1, characterized by the fact that the parametric coordinates of each macrocell summit are determined in a phase of initialization and storage in a memory such that the parametric coordinate w remains constant on each horizon and the gradient of the functions $u=u(x,y,z)$, $v=v(x,y,z)$ and $w=w(x,y,z)$ remain not zero at any point (x,y,z) of the geological domain.

4. Process according to claim 1, characterized by the fact that the parametric coordinates (u,v,w) of the image in the parametric field of any point of coordinates (x,y,z) located within a macrocell of the geological space, are computed by interpolation of the parametric coordinates of the supposed summits of the macrocell pre-calculated and stored in a memory.

5. Process according to claim 1, characterized by the fact that the data of the function f representative of a geological property observed at sampling points (xi,yi,zi) of the geological domain are transported into points (ui,vi,wi) of the parametric domain.

6. Process according to claim 1, characterized by the fact that the value f(x,y,z) of the modeled function is "transported" between a geologic point (x,y,z) and an image point (u,v,w) of the parametric domain.

7. Process according to claim 6, characterized by the fact that the value f(x,y,z) of the modeled function is interpolated at the nodes of the regular grid covering the parametric domain.

8. Process according to claim 6, characterized by the fact that the value f(x,y,z) at a geological point X(x,y,z) of the modeled function is obtained by reading the value of f associated with the node (i,j,k) nearest the image (u,v,w) of the point geological X(x,y,z) in the regular grid covering the parametric domain.

9. Device for three-dimensionally modeling a geological volume, in which there are defined cells (macrocells) adapted to the critical surfaces of the geological volume to be modeled, characterized by the fact that the device comprises means to define macrocells adapted to the geometry of the geological layers of the volume to be modeled, means to carry out a parametering of the geological space to match the geological domain studied and a parametric domain by associating with a point belonging to the geological domain an image located in the parametric domain; and means to define a virtual subdivision of said macrocells into microcells, whose geometry is obtained by subdivision of the geometry of each macrocell, such that the positions of the microcells will be deduced by interpolation of the positions of the summits of the corresponding macrocell and such that the microcells correspond to the nodes of a regular grid of the parametric domain.

10. Computer program, comprising program code elements to carry out the steps of the process according to claim 1, when said program is executed by a computer.

11. Process according to claim 2, characterized by the fact that the parametric coordinates of each macrocell summit are determined in a phase of initialization and storage in a memory such that the parametric coordinate w remains constant on each horizon and the gradient of the functions $u=u(x,y,z)$, $v=v(x,y,z)$ and $w=w(x,y,z)$ remain not zero at any point (x,y,z) of the geological domain.

12. Process according to claim 2, characterized by the fact that the parametric coordinates (u,v,w) of the image in the parametric field of any point of coordinates (x,y,z) located within a macrocell of the geological space, are computed by interpolation of the parametric coordinates of the supposed summits of the macrocell pre-calculated and stored in a memory.

13. Process according to claim 2, characterized by the fact that the data of the function f representative of a geological property observed at sampling points (xi,yi,zi) of the geological domain are transported into points (ui,vi,wi) of the parametric domain.

14. Process according to claim 2, characterized by the fact that the value f(x,y,z) of the modeled function is "transported" between a geologic point (x,y,z) and an image point (u,v,w) of the parametric domain.

* * * * *